May 26, 1925.
B. D. BARTON
POWER ATTACHMENT FOR MOTOR VEHICLES
Filed Dec. 7, 1923 2 Sheets-Sheet 1
1,538,881
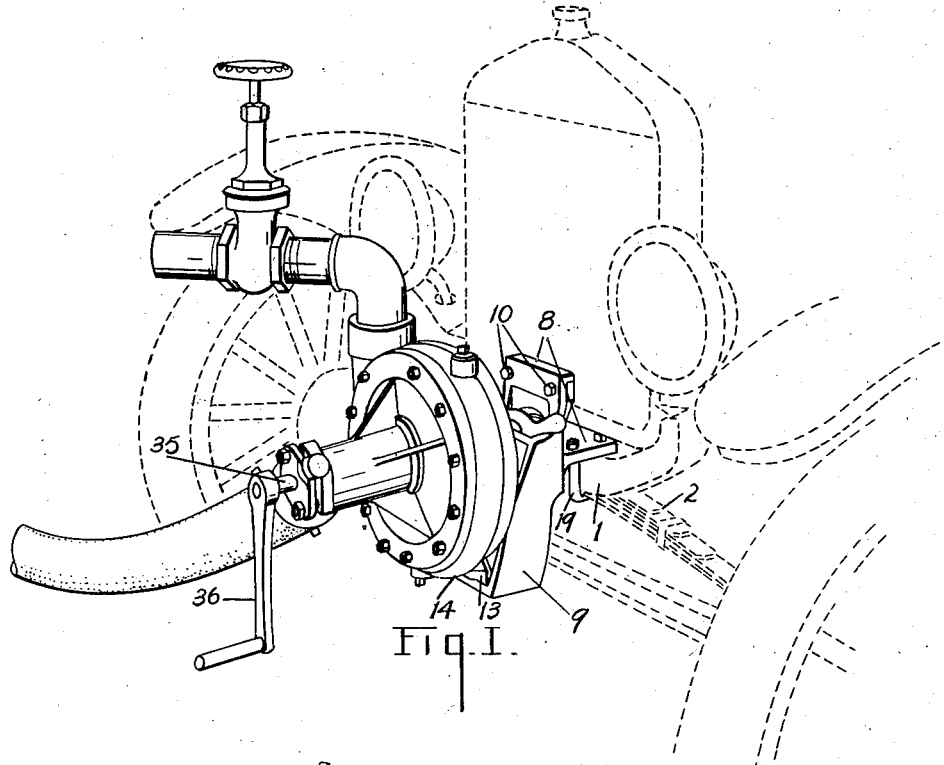
Fig. I.
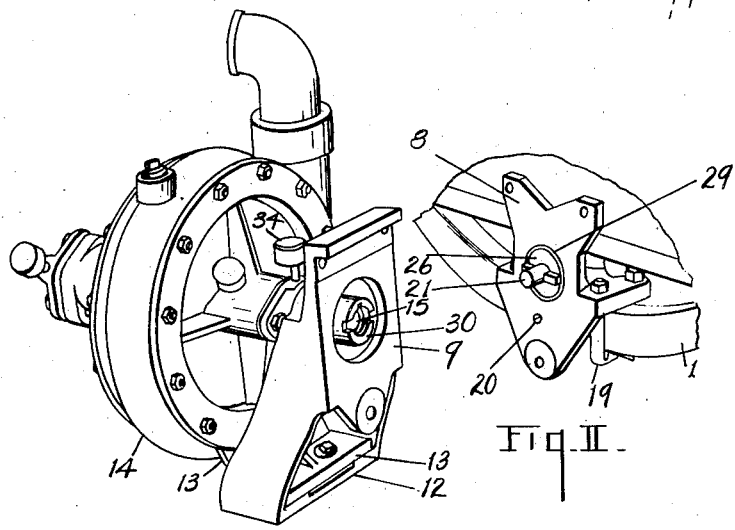
Fig. II.
Fig. IIA.
Inventor
Ben D. Barton
By Chappell & Earl
Attorneys

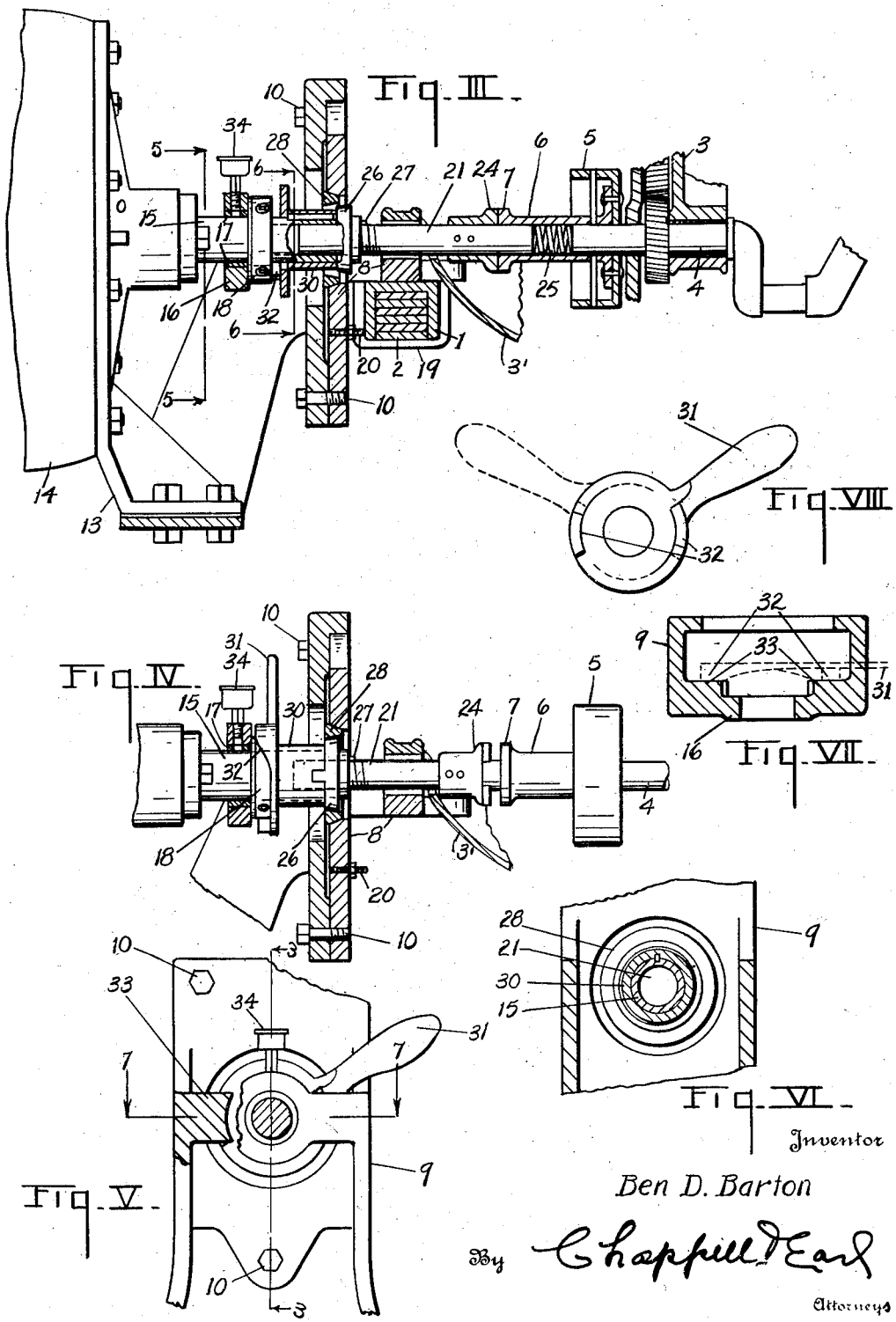

Patented May 26, 1925.

1,538,881

UNITED STATES PATENT OFFICE.

BEN D. BARTON, OF JACKSON, MICHIGAN.

POWER ATTACHMENT FOR MOTOR VEHICLES.

Application filed December 7, 1923. Serial No. 679,236.

*To all whom it may concern:*

Be it known that I, BEN D. BARTON, a citizen of the United States, residing at Jackson, county of Jackson, State of Michigan, have invented certain new and useful Improvements in Power Attachments for Motor Vehicles, of which the following is a specification.

This invention relates to improvements in power attachments for motor vehicles.

My improved power attachment as illustrated is a pumping attachment and I have illustrated my improvements as particularly designed for such purpose, although I desire to point out at this time that my improvements are readily adapted for driving other devices.

The main objects of my invention are:

First, to provide an improved pump attachment for motor vehicles which may be readily mounted upon the vehicle and is supported so that the strains upon the parts of the vehicle are minimized.

Second, to provide an improved pump attachment for motor vehicles which is very conveniently manipulated and is highly efficient.

Third, to provide an improved power attachment for motor vehicles in which the parts are so arranged as to secure a direct drive from the motor shaft.

Fourth, to provide an improved power attachment for motor vehicles which may be readily adjusted to compensate for variations in vehicle structures.

Fifth, to provide an improved power attachment for motor vehicles in which the thrust on the driven shaft is effectively sustained.

Sixth, to provide an improved power attachment for motor vehicles in which the parts are so formed and arranged that they may be readily set up or disassembled for convenience in transportation and handling.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a front perspective view of my improvements as embodied for a pumping apparatus mounted upon the vehicle.

Fig. II is a fragmentary front elevation of a portion of a motor vehicle with my improved supporting bracket mounted thereon.

Fig. II$^A$ is a rear perspective view of the pump mounted upon the detachable supporting frame.

Fig. III is a detail view partially in vertical longitudinal section on a line corresponding to line 3—3 of Fig. V, showing details of the driving parts and also of the supporting parts, the parts being shown with their driving clutches in engagement.

Fig. IV is a fragmentary sectional view corresponding to that of Fig. III with the clutch members disengaged.

Fig. V is a detail section on a line corresponding to line 5—5 of Fig. III.

Fig. VI is a detail section on a line corresponding to line 6—6 of Fig. III, showing further details of the driving connections.

Fig. VII is a detail section of the supporting frame on a line corresponding to line 7—7 of Fig. VI, the clutch control lever being indicated by dotted lines.

Fig. VIII is a side elevation of the clutch control lever shown by full lines in position corresponding to Fig. I and by dotted lines in position corresponding to Fig. IV.

In the drawing similar reference characters refer to similar parts throughout the several views and the sectional views are taken looking in the direction of the little arrows at the ends of the section lines.

Referring to the drawing, 1 represents the front cross member of the chassis frame of a motor vehicle and 2 the front spring thereof. The engine body is represented at 3 and 4 is the crank shaft. In practice I remove the fan belt pulley with which the machine is normally equipped and substitute therefor the fan belt pulley 5 which is provided with a forwardly projecting sleeve-like hub 6 terminating in a jaw clutch member 7. I also substitute a supporting bracket 8 for the bracket usually provided to support the forward engine hanger 3' and the end of the cranking spindle, the cranking spindle being also removed.

I detachably secure a supporting frame 9 to the bracket 8, the bracket being provided with suitable holes to receive attaching screws 10. This frame is provided with a stirrup-like extension 12 which receives a foot of the supporting bracket 13 of the pump 14, the pump illustrated being a centrifugal pump. The structural details of the pump are not shown as they form no part of this invention.

The driven or pump shaft 15 is arranged through a cross-piece 16 on the frame, the cross-piece being provided with a bearing 17. At the inner side of this bearing the shaft 15 is provided with a thrust collar 18 so that the thrust on the shaft is sustained by the supporting frame, and this is of particular advantage in a centrifugal pump where there is usually considerable end thrust on the impeller shaft. By this arrangement of parts I avoid the necessity of providing means for sustaining the end thrust within the pump itself.

It is intended that the bracket 8 shall remain upon the vehicle, the supporting frame 9 being removed as desired, although I have found that it is entirely practical to leave the pump mounted in operative position for transportation. This is especially desirable where the pump is used in construction work or for fire purposes and many other uses.

The bracket 8 is attached by means of U-bolts 19 embracing the frame cross-pieces 1. To reduce the twisting strain upon this cross-piece and the U-bolts I provide the plate 8 with a thrust screw 20—see Figs. III and IV, the screw being positioned on the plate to engage the side of the cross piece, a lock nut being provided for securing the screw in adjusted position. This I find in practice to be a feature of substantial merit.

The driven shaft 15 is aligned with the crank shaft 4 as is also the coupling shaft 21 interposed between the crank shaft and the driven shaft. The rear end of the coupling shaft 21 projects into the extended hub 6 and is provided with a jaw clutch member 24 coacting with the clutch 7, the shaft 21 being axially adjusted to engage and disengage these clutch members. The coiled spring 25 arranged within the hub 6 urges the coupling shaft to clutch disengaging position. The shaft 21 is provided with a coupling member 26 which is threaded for adjustment upon the shaft 21 and secured in its adjusted position by the key 27. The coupling shaft when in driving engagement becomes a floating shaft, that is, it is supported only by the driving and driven parts with which it is engaged. This coupling member engages and is supported by the bushing 28 arranged in an opening 29 in the bracket 8 when the shaft 21 is in position to disengage the clutch members 7 and 24. The purpose of this attachment is to accommodate the structure for variations which are found to exist in motor vehicles as they are in use, that is, variations in the same model or type of vehicle.

Splined to the shaft 15 is a sleeve 30 coacting with the coupling member 26, this coupling sleeve being provided to connect the shaft 15 with the coupling shaft 21 when the supporting frame is mounted on the bracket 8 and provides for disconnecting these shafts when the frame is removed.

The clutch members 7 and 24 are engaged by means of the lever 31 rotatably mounted upon the driven shaft 15 at the rear of the thrust collar 18 and have cams 32 coacting with the projections 33 on the frame cross member 16.

When the lever is shifted to the position shown by full lines in Fig. VIII and by dotted lines in Fig. VII the coupling shaft 21 is shifted longitudinally and its clutch member 24 engaged with the clutch member 7. When the clutch control lever 31 is shifted to the position shown by dotted lines in Fig. VIII the shaft 21 is free to move forward under the action of the spring 25, thereby disengaging the clutch. An oil cup 34 is provided for the bearing for the driven shaft 15 and this also supplies sufficient lubricant to the clutch lever for the coupling sleeve. I provide a crank 36 with a spindle 35 adapted to be engaged with the driven shaft, suitable ratchet or throw-out connection not being illustrated.

When it is desired to crank the motor it is first necessary to engage the clutch members by means of the lever 31.

My improved pump attachment is highly efficient, it being found that a motor such as in Ford automobiles is capable of handling a large volume of water without undue strain upon the motor. As stated, the parts are arranged so that they may be readily mounted or dismounted and the pump may be transported while mounted without undue strain on the vehicle.

While I have illustrated my improvements in detail as I have embodied them in a pumping mechanism, devices other than pumps may be driven from the shaft 15.

I have not attempted to illustrate or describe various adaptations or modifications which I contemplate as I believe the disclosure made will enable those skilled in the art to which my invention relates to embody or adapt the same as may be desired.

Having thus described my invention, what I claim as new and desire to secure by Letters Patent, is:

1. The combination with a chassis frame and a driving shaft, of a supporting bracket secured to said frame, a supporting frame detachably mounted on said supporting bracket and provided with a cross member provided with a bearing, a driven shaft disposed in said bearing, a thrust collar secured on said driven shaft at the inner side of said supporting frame cross member to coact therewith, a driving clutch member on said driving shaft, a coupling shaft mounted for axial movement in the said driven shaft and clutch member, said coupling shaft being provided with a driven clutch member coacting with said driving clutch member, a spring arranged to urge said coupling shaft to clutch disengaging position, a coupling sleeve splined to said driven shaft, a coacting coupling member mounted upon said coupling shaft, and a clutch lever rotatably mounted on said driven shaft to coact with said coupling sleeve and provided with cams coacting with said cross member of said supporting frame.

2. The combination with a chassis frame provided with a front cross member and an engine mounted on said frame provided with a driving shaft, of a supporting bracket secured to said front cross member, a supporting frame mounted on said supporting bracket and provided with a cross member, a driven shaft, a thrust collar secured to said driven shaft at the inner side of said supporting frame cross member to coact therewith, a driving clutch member on said driving shaft, a coupling shaft mounted for axial movement and provided with a driven clutch member coacting with said driving clutch member, a spring for disengaging said clutch members, a coupling member splined to said driven shaft, a coacting coupling member threaded upon said coupling shaft for adjustment thereon to compensate for variations in chassis frame or engine mounting, and means for engaging said clutch members.

3. The combination with a chassis frame provided with a front cross member and a driving shaft, of a supporting bracket secured to said front frame cross member, a supporting frame detachably mounted on said supporting bracket, a screw disposed on said supporting bracket to engage the side of said frame cross member as a supporting member for said bracket, a driven element mounted on said supporting frame, and driving connections for said driven element to said driving shaft including a clutch.

4. The combination with a chassis frame provided with a front cross member and an engine mounted on said frame and provided with a driving shaft, of a supporting bracket secured to said front cross member, a supporting frame detachably mounted on said supporting bracket and provided with a cross member, a pump mounted on said supporting frame and having a shaft disposed through said cross member, a thrust collar secured on said shaft at the inner side of said supporting frame cross member to coact therewith, a driving clutch member on said driving shaft, a coupling shaft mounted for axial movement and provided with a driven clutch member coacting with said driving clutch member, a coupling sleeve splined to said pump shaft, a coacting coupling member on said coupling shaft, and a clutch lever coacting with said coupling sleeve for engaging said clutch member.

5. The combination with a chassis frame and a driving shaft, of a supporting bracket secured to said frame, a supporting frame detachably mounted on said supporting bracket and provided with a depending stirrup-like member and with a cross member, a pump mounted on said stirrup-like member of said supporting frame and having a shaft disposed through said cross member, a thrust collar secured on said pump shaft at the inner side of said cross member to coact therewith, and driving connections for said pump shaft to said driving shaft including a clutch.

6. The combination with a chassis frame and driving shaft, of a supporting frame mounted on said chassis frame, and provided with a cross member, a pump mounted on said supporting frame and having a shaft disposed through said cross member, a thrust member on said pump shaft at the inner side of said cross member to coact therewith, and driving connections for said pump shaft to said driving shaft including a clutch.

7. The combination with a chassis frame and a driving shaft, of a supporting bracket secured to said frame, a supporting frame detachably mounted on said supporting bracket and provided with a cross member, a pump mounted on said supporting frame and having a shaft disposed through said cross member, a thrust member on said pump shaft at the inner side of said cross member to coact therewith, and driving connections for said pump shaft to said driving shaft including a clutch.

8. The combination with a chassis frame and driving shaft, of a supporting frame mounted on said chassis frame, a pump mounted on said supporting frame and provided with a shaft carried by said frame, a thrust member for said pump shaft carried by said frame, and driving connections for said pump shaft to said driving shaft including a clutch.

In witness whereof, I have hereunto set my hand.

BEN D. BARTON. [L. S.]